United States Patent
Wu et al.

(10) Patent No.: US 9,125,061 B2
(45) Date of Patent: Sep. 1, 2015

(54) SYSTEMS AND METHODS FOR CHANNEL ALLOCATION FOR FORWARD-LINK MULTI-USER SYSTEMS

(75) Inventors: Jianming Wu, Kanata (CA); Wen Tong, Ottawa (CA); Daniel Boudreau, Hull (CA)

(73) Assignee: APPLE INC., Cupertino, CA (US)

( * ) Notice: Subject to any disclaimer, the term of this patent is extended or adjusted under 35 U.S.C. 154(b) by 2405 days.

(21) Appl. No.: 10/400,882

(22) Filed: Mar. 28, 2003

(65) Prior Publication Data

US 2004/0125772 A9 Jul. 1, 2004

Related U.S. Application Data

(60) Provisional application No. 60/386,477, filed on Jun. 7, 2002.

(51) Int. Cl.
| | |
|---|---|
| *H04B 7/216* | (2006.01) |
| *H04W 16/12* | (2009.01) |
| *H04W 72/04* | (2009.01) |
| *H04W 72/12* | (2009.01) |

(52) U.S. Cl.
CPC .......... *H04W 16/12* (2013.01); *H04W 72/0453* (2013.01); *H04W 72/1257* (2013.01)

(58) Field of Classification Search
CPC ............ H04W 16/12; H04W 72/1257; H04W 72/0453
USPC .................................. 370/310, 342; 455/447
See application file for complete search history.

(56) References Cited

U.S. PATENT DOCUMENTS

| | | | | | |
|---|---|---|---|---|---|
| 5,063,445 | A | * | 11/1991 | Nishizawa et al. | 375/240.25 |
| 5,506,916 | A | * | 4/1996 | Nishihara et al. | 382/232 |
| 5,511,233 | A | * | 4/1996 | Otten | 455/524 |
| 5,574,750 | A | * | 11/1996 | Peponides et al. | 375/224 |

(Continued)

FOREIGN PATENT DOCUMENTS

| | | | | |
|---|---|---|---|---|
| EP | 1032231 | 8/2000 | | H04Q 7/36 |
| WO | 0176308 | 10/2001 | | H04Q 7/38 |

OTHER PUBLICATIONS

A Proportionally Fair Scheduling Algorithm With QOS and Priority in IXEV-DO Kuenyoung Kim, Hoon Kim, Youngnam Han School of Comunication Engineering, Information and Communications University, Korea pp. 2239-2243.

(Continued)

*Primary Examiner* — Jay P Patel
(74) *Attorney, Agent, or Firm* — Fay Kaplun & Marcin, LLP

(57) ABSTRACT

A method of allocating bandwidth is provided which involves for each sector of a plurality of sectors in a cell, using a respective subset of a total bandwidth; wherein for any two adjacent sectors, the respective subsets only partially overlap. A scheduling method is provided which involves for each sector, scheduling users for transmission on the respective subset of the total bandwidth by: for a given transmitter, allocating a respective fraction of capacity associated with the available bandwidth to each of at least two users selected from a plurality of users by performing an optimization for a selected scheduler design, the optimization selecting the at least two users and the optimization determining for each user the respective fraction of capacity; generating and transmitting a signal in which each of the at least two users has the respective fraction of capacity.

51 Claims, 13 Drawing Sheets

(56) References Cited

U.S. PATENT DOCUMENTS

| | | | |
|---|---|---|---|
| 5,719,902 A * | 2/1998 | Quick et al. | 375/224 |
| 5,850,608 A * | 12/1998 | Faruque | 455/447 |
| 5,974,323 A * | 10/1999 | Doner | 455/447 |
| 5,974,324 A * | 10/1999 | Henson | 455/447 |
| 6,014,545 A * | 1/2000 | Wu et al. | 725/118 |
| 6,028,884 A * | 2/2000 | Silberger et al. | 375/130 |
| 6,047,186 A * | 4/2000 | Yu et al. | 455/446 |
| 6,061,568 A * | 5/2000 | Dent | 455/450 |
| 6,088,592 A * | 7/2000 | Doner et al. | 455/447 |
| 6,094,425 A * | 7/2000 | Auger et al. | 370/330 |
| 6,154,654 A * | 11/2000 | Mao | 455/446 |
| 6,229,796 B1 | 5/2001 | Dent | 370/335 |
| 6,243,584 B1 | 6/2001 | O'Byrne | 455/447 |
| 6,275,704 B1 * | 8/2001 | Dixon | 455/446 |
| 6,522,885 B1 * | 2/2003 | Tang et al. | 455/447 |
| 6,529,488 B1 * | 3/2003 | Urs et al. | 370/330 |
| 6,539,203 B1 * | 3/2003 | Herrig | 455/62 |
| 6,556,829 B1 * | 4/2003 | Persson | 455/437 |
| 6,560,459 B1 * | 5/2003 | Wong | 455/447 |
| 6,564,061 B1 * | 5/2003 | Guo et al. | 455/452.1 |
| 6,606,500 B1 * | 8/2003 | Kronestedt | 455/453 |
| 6,657,980 B2 * | 12/2003 | Holtzman et al. | 370/329 |
| 6,714,780 B1 * | 3/2004 | Antonio et al. | 455/425 |
| 6,842,440 B2 * | 1/2005 | Paneth et al. | 370/330 |
| 6,892,068 B2 * | 5/2005 | Karabinis et al. | 455/429 |
| 6,917,580 B2 * | 7/2005 | Wang et al. | 370/203 |
| 7,099,413 B2 * | 8/2006 | Chuang et al. | 375/347 |
| 7,280,473 B2 * | 10/2007 | Wu et al. | 370/234 |
| 7,453,801 B2 * | 11/2008 | Taneja et al. | 370/230 |
| 7,499,397 B1 * | 3/2009 | Monk et al. | 370/230.1 |
| 2003/0050067 A1 * | 3/2003 | Rozmaryn | 455/447 |

OTHER PUBLICATIONS

XP-000860004; The Radio Interface; 1995; pp. 186-259.

WG5 Evaluation AHG; 1xEV-DV Evaluation Methodology—Addendum (V6); Jul. 25, 2001; pp. 1-89.

3G TR25.848 V0.0. (May 2000) Technical Report; $3^{rd}$ Generation Partnership Project; Technical Specification Group Radi Access Network; Physical Layer Aspects of Utra High Speed Downlink Packet Access; (Release 2000); pp. 1-97.

Jianming Wu; Wen Tong; A Data Streaming Service Using Adaptive Transmission Scheduling; Aug. 29, 2002; pp. 1-12.

* cited by examiner

SYSTEMS AND METHODS FOR CHANNEL ALLOCATION FOR FORWARD-LINK MULTI-USER SYSTEMS

RELATED APPLICATION

This application claims the benefit of U.S. Provisional Application No. 60/386,477 filed Jun. 7, 2002.

FIELD OF THE INVENTION

The invention relates to systems and methods for channel allocation for forward-link multi-user systems.

BACKGROUND OF THE INVENTION

Orthogonal frequency division multiplexing (OFDM) [1] is a special case of multi-carrier transmission, where a single data-stream is transmitted over a number of lower rate sub-carriers. One of the main reasons for using OFDM in recent wireless communication developments is to increase the robustness against frequency selective fading or narrowband interference. On the downlink, OFDM techniques can provide very high-speed downlink packet access by means of a high-speed downlink shared channel based on adaptive modulation and coding (AMC) [2]. However, OFDM requires high signal-to-noise ratio (SNR) in order to provide high-speed packet data transmission.

High-speed downlink packet access (HSDPA) [2] and 1xEV-DV systems [3] based on CDMA techniques have been used to transmit data information. With these schemes, the serving base-station (BS) allocates an active channel (N PN Walsh codes) to a particular served mobile. Such systems, however, do not consider the optimum allocation of Walsh codes for multiple users in each slot.

In the next deployment phase of current cellular systems, such as HSDPA and 1xEV-DV, the frequency assignment is based on the reuse-1, where each sector in each cell utilizes the entire frequency band. This may result in low SNRs for many users, due to the interference from other cells. An OFDM system requires high SNRs to support high-speed data rate transmission.

The frequency reuse-1 scheme is illustrated diagramatically in FIG. 1 where a cell generally indicated by 10 has three sectors 12, 14 and 16. All three of these sectors are operating on the same frequency band "F".

SUMMARY OF THE INVENTION

According to one broad aspect, the invention provides a method of allocating bandwidth comprising: for each sector of a plurality of sectors in a cell, using a respective subset of a total bandwidth; wherein for any two adjacent sectors, the respective subsets only partially overlap.

In some embodiments, the method comprises: for each cell, sub-dividing the total frequency bandwidth into a plurality of fixed sub-bands; for each sector, allocating the respective subset to be at least two of the fixed sub-bands.

In some embodiments, the fixed sub-bands are equal in size.

In some embodiments, the method further comprises: in each sector, transmitting a respective user transmission on each of the sub-bands.

In some embodiments, the method further comprises: for pairs of sectors that face each other of different cells, allocating respective subsets which only partially overlap.

In some embodiments, two thirds of the total frequency bandwidth is allocated to each of the three sectors such that each sector shares one third of the total frequency bandwidth with each adjacent sector.

In some embodiments, the method further comprises: for each sector, scheduling users for transmission on the respective subset of the total bandwidth by: for a given transmitter, allocating a respective fraction of capacity associated with the available bandwidth to each of at least two users selected from a plurality of users by performing an optimization for a selected scheduler design, the optimization selecting the at least two users and the optimization determining for each user the respective fraction of capacity; generating and transmitting a signal in which each of the at least two users has the respective fraction of capacity.

In some embodiments, the optimization is performed every transmission interval, and the optimization maximizes sector throughput.

In some embodiments, the scheduler design is selected from a group comprising: proportional fairness, proportional fairness for FTP traffic, adaptive scheduler, adaptive scheduler for video service.

In some embodiments, the optimization performs a maximization of proportional factors relative to user transmission rate and average user throughput, while keeping a total frequency bandwidth constant.

In some embodiments, the method further comprises in performing the optimization, using an unconstrained optimization obtained by using a Lagrangian of a constrained optimization.

In some embodiments, the optimization comprises: for each pair of users indicated by $k_0$ and $k_1$ associating respective $F_{i0}$ and $F_{i1}$, and respective bandwidths of $W_{k_i}^{(F_{i1})}$; determining a transmission rate for each selected user in each slot to be $R_{k_0}$ and $R_{k_1}$, when using the available frequency bandwidth $W$, and with sub-bandwidths of $W_{k_0}^{(F_{i0})}$ and $W_{k_1}^{(F_{i1})}$, determining transmission rates $R_{k_0}^{(F_{i0})}$ and $R_{k_0}^{(F_{i1})}$ according to $$R_{k_0}^{(F_{i0})} = R_{k_0} \cdot \frac{W_{k_0}^{(F_{i0})}}{W}$$

$$R_{k_1}^{(F_{i1})} = R_{k_1} \cdot \frac{W_{k_1}^{(F_{i1})}}{W}$$

and performing optimization which maximizes sector throughput, applied to two users per sector or generalized to N users per sector, where N>=3.

In some embodiments, the optimization is formulated as follows:

$$\underset{W_{k_0}^{(F_{i0})}, W_{k_1}^{(F_{i1})}, k_0, k_1}{\text{Max}} \left( \frac{(R_{k_0} \cdot W_{k_0}^{(F_{i0})})^\alpha}{T_{k_0}^\beta} + \frac{(R_{k_1} \cdot W_{k_1}^{(F_{i1})})^\alpha}{T_{k_1}^\beta} \right)$$

$$\text{subject to}: W_{k_0}^{(F_{i0})} + W_{k_1}^{(F_{i1})} = W, k_0 \neq k_1$$

where $T_k$ is an average user throughput for user k over a long period of time and $\alpha$ and $\beta$ are indices used to control the fairness for scheduling, applied for two users, or generalized to schedule N users in the transmission interval, where N>=3.

In some embodiments, the method further comprises using a Lagrangian of the optimization to obtain the following unconstrained optimization formula:

$$\underset{k_0,k_1}{\text{Max}}\left(\frac{(R_{k_0}\cdot W_{k_0}^{(F_i o)})^\alpha}{T_{k_0}^\beta}+\frac{(R_{k_1}\cdot W_{k_1}^{(F_i l)})^\alpha}{T_{k_1}^\beta}\right)$$

where $W_{k_0}^{(F_i o)}=\dfrac{\Gamma W}{1+\Gamma}$, $$W_{k_1}^{(F_i l)}=\frac{W}{1+\Gamma},$$

$$\Gamma=\left[\frac{(T_{k_0})^\beta\cdot(R_{k_1})^\alpha}{(T_{k_1})^\beta\cdot(R_{k_0})^\alpha}\right]^{\frac{1}{\alpha-1}},$$

$$k_0\neq k_1.$$

In some embodiments, the method further comprises: in each sector, transmitting an OFDM signal using the respective subset of the total OFDM bandwidth.

In some embodiments, in each sector, transmitting an OFDM signal using the respective subset of the total OFDM bandwidth comprises: generating the OFDM signal from content of at least two users.

In some embodiments, in each sector generating the OFDM signal from content of at least two users comprises: mapping symbols from each user into a time domain representation; converting the time domain representation into the OFDM signal.

In some embodiments, mapping symbols from each user into a time domain representation comprises interleaving.

In some embodiments, the method further comprises: for each sector, performing an optimization to identify the at least two users, and to determine for each user a respective number of symbols to be mapped into said time domain representation.

According to another broad aspect, the invention provides a method of scheduling users for transmission on an available bandwidth comprising: for a given transmitter, allocating a respective fraction of capacity associated with the available bandwidth to each of at least two users selected from a plurality of users by performing an optimization for a selected scheduler design, the optimization selecting the at least two users and the optimization determining for each user the respective fraction of capacity; generating and transmitting a signal in which each of the at least two users has the respective fraction of capacity.

In some embodiments, the optimization is performed every transmission interval, and the optimization maximizes sector throughput.

In some embodiments, the scheduler design is selected from a group comprising: proportional fairness, proportional fairness for FTP traffic, adaptive scheduler, adaptive scheduler for video service.

In some embodiments, the optimization performs a maximization of proportional factors relative to user transmission rate and average user throughput, while keeping a total frequency bandwidth constant.

In some embodiments, the method further comprises in performing the optimization, using an unconstrained optimization obtained by using a Lagrangian of a constrained optimization.

In some embodiments, the signal is an OFDM signal, the method further comprising generating the OFDM signal from content of at least two users by mapping with interleaving symbols from each user into a time domain representation and converting the time domain representation into the OFDM signal.

In some embodiments, for each sector, the optimization determines for each of the selected users a respective number of symbols to be mapped into the time domain representation, the respective number of symbols comprising said respective fraction of capacity.

In some embodiments, the optimization performs a maximization of proportional factors relative to user transmission rate and average user throughput, while keeping a total frequency bandwidth constant.

In some embodiments, the optimization comprises: for each pair of users indicated by $k_0$ and $k_1$ with respective sub-bandwidths of $W_{k_0}$ and $W_{k_1}$, determining a transmission rate for each user in each slot to be $R_{k_0}$ and $R_{k_1}$, when using the available frequency bandwidth W, and with sub-bandwidths of $W_{k_0}$ and $W_{k_1}$, according to $$R_{k_0}=R_{k_0}\cdot\frac{W_{k_0}}{W}$$

$$R_{k_1}=R_{k_1}\cdot\frac{W_{k_1}}{W}$$

and performing optimization which maximizes sector throughput.

In some embodiments, the method is generalized to schedule N users per sector, where N>=3.

In some embodiments, the method further comprises: receiving a channel quality indication from each user being considered for scheduling; for each permutation of two users, calculating transmission rates according to adaptive modulation and coding as a function of the channel quality indications and using the calculated transmission rates in the optimization.

In some embodiments, the channel quality indications comprise SNR (signal-to-noise ratio) values.

In some embodiments, the optimization is formulated as follows:

$$\underset{W_{k_0},W_{k_1},k_0,k_1}{\text{Max}}\left(\frac{(R_{k_0}\cdot W_{k_0})^\alpha}{T_{k_0}^\beta}+\frac{(R_{k_1}\cdot W_{k_1})^\alpha}{T_{k_1}^\beta}\right)$$

Subject to: $W_{k_0}+W_{k_1}=W,\ k_0\neq k_1$ where $T_k$ is an average user throughput for user k over a long period of time and $\alpha$ and $\beta$ are the indices used to control the fairness for scheduling.

In some embodiments, the method is generalized to schedule N users in the transmission interval, where N>=3.

In some embodiments, the method further comprises using a Lagrangian of the above optimization to obtain the following unconstrained optimization formula:

$$\underset{k_0,k_1}{\text{Max}}\left(\frac{(R_{k_0}\cdot W_{k_0})^\alpha}{T_{k_0}^\beta}+\frac{(R_{k_1}\cdot W_{k_1})^\alpha}{T_{k_1}^\beta}\right)$$

where $W_{k_0}=\dfrac{\Gamma W}{1+\Gamma}$, $$W_{k_1}=\frac{W}{1+\Gamma},$$

$$\Gamma=\left[\frac{(T_{k_0})^\beta\cdot(R_{k_1})^\alpha}{(T_{k_1})^\beta\cdot(R_{k_0})^\alpha}\right]^{\frac{1}{\alpha-1}},$$

$$k_0\neq k_1.$$

In some embodiments, the method is generalized to schedule N users in the transmission interval, where N>=3.

In some embodiments, the method further comprises allocating bandwidth by: for each sector of a plurality of sectors in a cell, using a respective subset of a total bandwidth; wherein for any two adjacent sectors, the respective subsets only partially overlap.

In some embodiments, said signal is a CDMA signal, the method further comprising generating the CDMA signal from content of at least two users by modulating content of each user to a respective subset of a set of orthogonal codes.

In some embodiments, for each sector, the optimization determines for each of the at least two users a respective number of orthogonal codes in the respective subset, the respective number of orthogonal codes comprising said respective fraction of capacity.

In some embodiments, the optimization performs a maximization of proportional factors relative to user transmission rate and average user throughput, while keeping the total frequency bandwidth constant.

In some embodiments, two users indicated by $k_0$ and $k_1$ are to be selected to transmit data with a number of Walsh codes $N_{K_0}^{(L)}$ and $N_{k_1}^{(L)}$, respectively and at transmission rate for each $R_{k_0}$ and $R_{k_1}$ respectively when using all N available codes, whereby the transmission rates $R_{k_0}^{(L)}$ and $R_{k_1}^{(L)}$ with Walsh codes $N_{k_0}^{(L)}$ and $N_{k_1}^{(L)}$ can be obtained $$R_{k_0}^{(L)} = R_{k_0} \cdot \frac{N_{k_0}^{(L)}}{N}$$

$$R_{k_1}^{(L)} = R_{k_1} \cdot \frac{N_{k_1}^{(L)}}{N}.$$

In some embodiments, the method is generalized to schedule M users each scheduling period.

In some embodiments, proportional fairness as a user scheduler is employed, and the optimization maximizes a proportional factor relative to user transmission rate and average user throughput, while keeping the total number of orthogonal codes constant.

In some embodiments, the optimization is be formulated as follows:

$$\underset{N_{k_0}^{(L)}, N_{k_1}^{(L)}, k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right)$$

subject to:

$$N_{k_0}^{(L)} + N_{k_1}^{(L)} = N,$$

$$k_0 \neq k_1$$

where $T_k$ is an average user throughput for user k, and $\alpha$ and $\beta$ are the indices used to control the fairness for scheduling.

In some embodiments, the method further comprises using a Lagrangian of the optimization to obtain the following unconstrained optimization formula:

$$\underset{k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right)$$

where $$N_{k_0}^{(L)} = \frac{\Phi N}{1+\Phi}, N_{k_1}^{(L)} = \frac{N}{1+\Phi}, \Phi = \left[ \frac{(T_{k_0})^\beta \cdot (R_{k_1})^\alpha}{(T_{k_1})^\beta \cdot (R_{k_0})^\alpha} \right]^{\frac{1}{\alpha-1}}, k_0 \neq k_1.$$

In some embodiments, the orthogonal codes are Walsh codes.

In other broad aspects of the invention, an apparatus is provided which implements any one of the above summarized methods. In some implementations the apparatus is implemented as part of a base station, antenna subsystem, Node-B, or multi-sector transmitter to name a few examples.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Frequency Reuse

An embodiment of the invention provides a frequency reuse-3 technique, to limit the interference and to increase the SNR. In a given cell, it is assumed that the bandwidth available is "F", and this has been divided into three sub-bands F1,F2,F3 each of which occupy a third of the available bandwidth F. However, each sector is only allowed to use two of the sub-bands, and for each pair of adjacent sectors (within the same cell or between cells) there will always be at least one sub-band assigned to each sector which is not common between the pair.

Figure 2A:
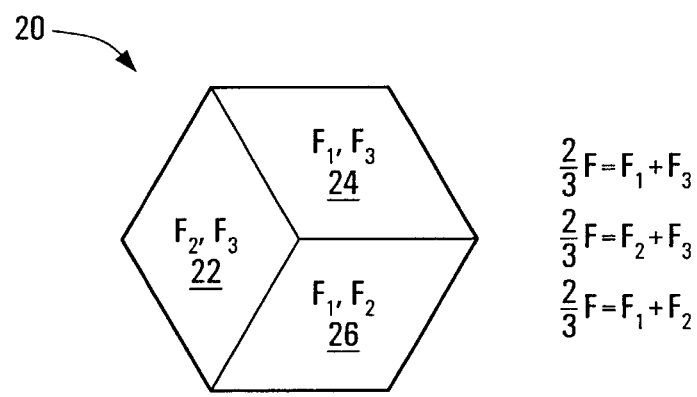
FIG. 2A is a cell showing frequency reuse-3 in accordance with an embodiment of the invention.

An example of frequency reuse-3 is shown in FIG. 2A. Here, a cell generally indicated by 20 has three sectors 22,24, 26. Sector 22 is operating with frequencies F2 and F3. Sector 24 operates with frequencies F1 and F3. Sector 26 operates with frequencies F1 and F2. It can be seen that with this particular frequency assignment, adjacent sectors each have one(more generally at least one) frequency or sub-band in common and one (more generally at least one) frequency or sub-band which is not in common. Other numbers of sectors and/or sub-bands per cell may be employed.

Figure 2B:
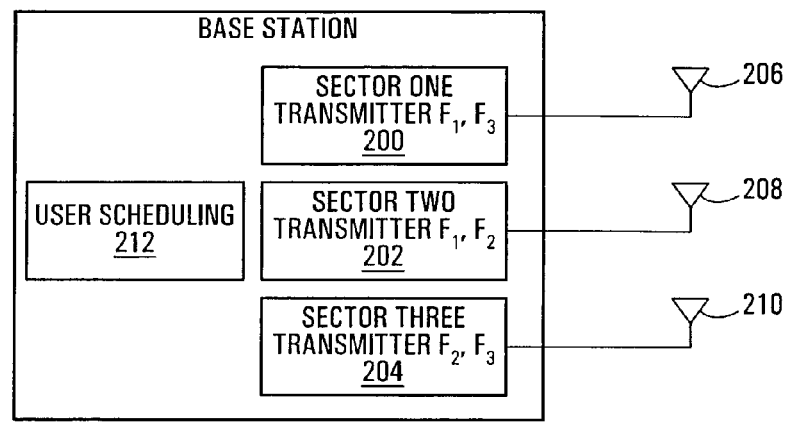
FIG. 2B is a block diagram of a system implementing the cell of FIG. 2A.

FIG. 2B is a very basic block diagram of a transmitter, such as a base station, adapted to implement the frequency reuse-3 plan discussed above. In this example, there are three sector transmitters, namely sector one transmitter 200, sector two transmitter 202 and sector three transmitter 204. Each transmitter is connected to respective sector antenna 206,208,210. Sector one transmitter 200 operates using frequencies F1,F3. Sector two transmitter 202 operates with frequencies F1,F2. Sector three transmitter 204 operates with frequencies F2,F3. User scheduling function 221 is shown. This is responsible for performing the above discussed optimization process to determine which users are to be scheduled and on which frequency for each sector. It is to be understood that different numbers of sectors and different numbers of frequency sub-bands could be employed.

Figure 3:
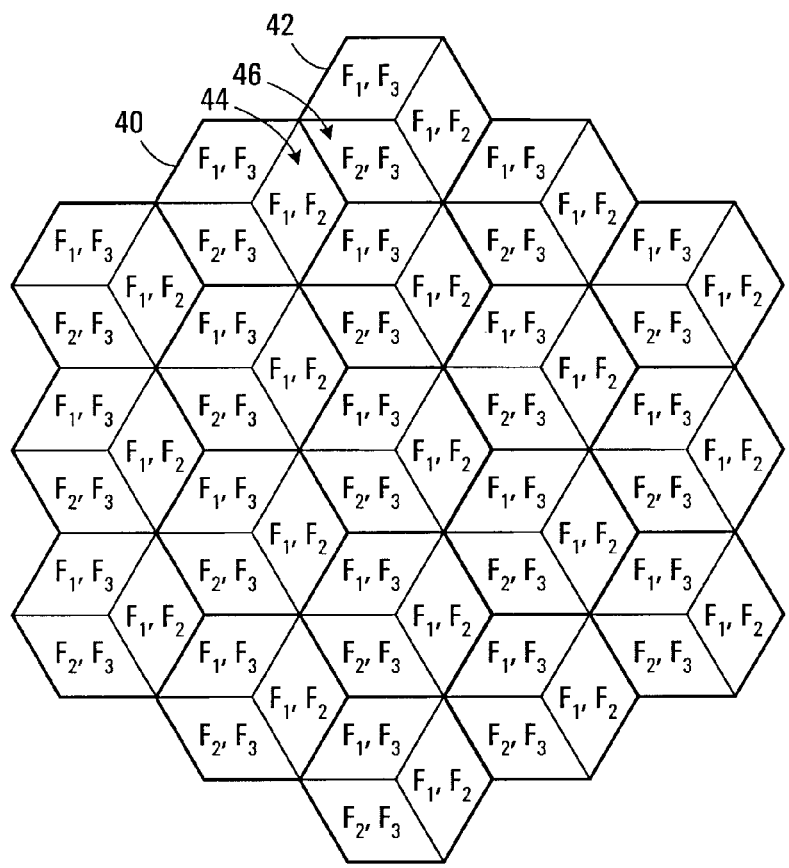
FIG. 3 shows how multiple cells in accordance with FIG. 2 can be combined to provide a coverage strategy.

An example deployment of a number of cells with frequency assignments as shown in FIG. 2A is shown in FIG. 3. Here, each cell has sectors with sub-bands assigned in accordance with the above-described example. Furthermore, the cells are arranged such that the sectors of adjacent cells also include at least one sub-band assigned to the sectors which is not common between the pair. For example, cells 40 and 42 have sectors 44 and 46 which are adjacent. These sectors share sub-band F2, but sector 44 also includes sub-band F1 which is not in common with sub-band F3 of sector 46.

In some embodiments, each sub-band is assigned to a given user's transmission during each scheduling period. Preferably, active users are assigned based on the maximum received average CIR (Geometry) with consideration given to the—best cell, best sector, and best frequency sub-band. For example, assume there are N users in each sector of FIG. 3 (in which there are 57 sectors), resulting in N*57 users in the entire system. In some embodiments, the users to be scheduled are selected based on not only the geometry from 57-sectors but also from the different frequency bands. This achieves both space and frequency diversities. Preferably, the selection is implemented very slowly and is referred to below as slow hand-off.

Figure 2C:
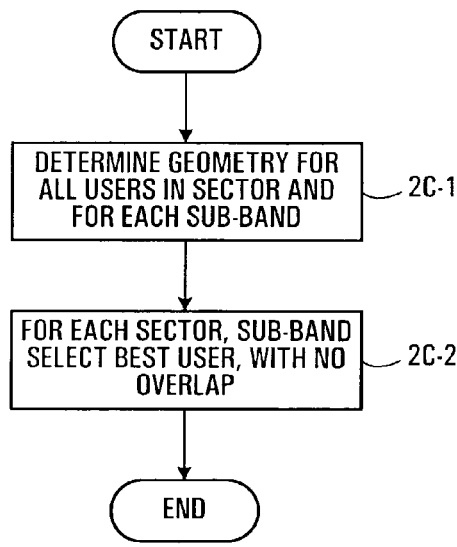
FIG. 2C is a flowchart of a method of scheduling which can be employed by the base station of FIG. 2B.

FIG. 2C is a very simple flowchart for an example scheduling method. In this example, at step 2C-1 the geometry is determined for all users in the sector and for each sub-band allocated to the sector. Next, at step 2C-2, for each sector and sub-band, the user with the best geometry is selected such that no user is scheduled twice. While the figure assumes that the user geometry is employed for scheduling, it is to be understood that other performance parameters could alternatively be employed.

Figure 4:
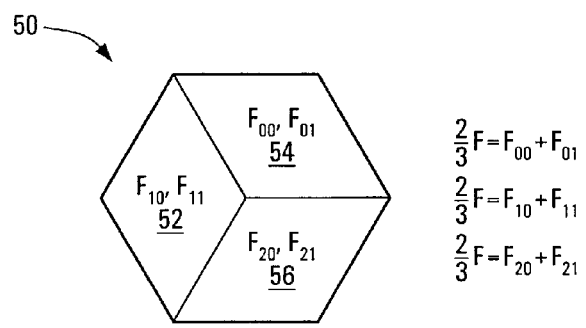
FIG. 4 shows a cell in which frequency reuse-3 is employed, but unequal bandwidths are allocated to different users in a given sector.

In another embodiment of the invention, a bandwidth is defined for each sector which overlaps similar to that of the embodiment of FIG. 2A. Thus, one sector has a bandwidth F1+F3, another sector has a bandwidth F1+F2, and another sector has a bandwidth F2+F3. However, in this embodiment individual users are not assigned equal amounts of bandwidth. Rather, subsets, potentially unequal, of the assigned bandwidth in a given sector are assigned to users using an optimization process. The manner by which this type of cell layout is used is illustrated in FIG. 4. In FIG. 4, the 2/3 F assigned to each sector are different, and may involve the above described F1,F2,F3 allocation for example.

With frequency reuse-3, two active users in each sector are scheduled slot by slot, to transmit the data signal, and each user occupies the frequency bandwidth $F_{ik}$, where i and k indicate the sector number and the active user number, respectively, and i=0,1,2 and k=0,1. The frequency bandwidth assigned to each user is controllable. For example this might depend on the reported SNR. The control would be subject to the constraint that $$\frac{2}{3}F = F_{i0} + F_{i1}, \qquad \text{Equation 1}$$
$$i = 0, 1, 2$$

FIG. 4 shows a cell 50 with three sectors 52, 54 and 56. Two users are assigned to sector 52 with frequencies $F_{10}$ and $F_{11}$ respectively. Similarly, two users are assigned to sector 54 with sub-bands $F_{00}$ and $F_{01}$ respectively. Finally, for sector 56 two users are assigned with sub-bands $F_{20}$ and $F_{21}$ respectively. While the actual values for each $F_{ik}$ can change from slot to slot, the sum of the assigned bandwidth in a given sector occupies a constant bandwidth. Furthermore, the bandwidth will share a portion of the bandwidth with adjacent sectors, but will also include a portion which is not in common.

The above-described embodiments have assumed that the entire frequency band F has been divided into three sub-bands of which two are assigned to each sector. This allows the scheduling of two active users per sector per slot. This can be extended to accommodate more users per slot if the entire frequency band F is divided into more sub-frequency bands. For example, if k=0,1,2, ..., K-1, the number of active users could be K.

Active User Determination Based on Slow Handoff

Figure 1:
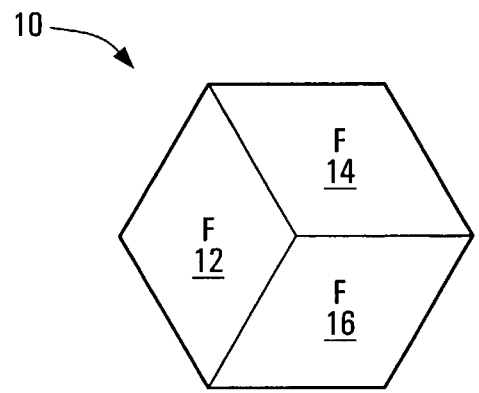
FIG. 1 is an example of a cell showing conventional frequency reuse-1.

In HSDPA and 1xEV-DV system, each mobile has to determine its serving BS based on the received long-term average pilot power corresponding to path loss and shadowing. That is, the mobile picks up a BS, which provides a strongest received power among all sectors. However, with respect to the active user determination with frequency reuse-3, as shown in FIG. 1, the additional frequency selection should be taken into account. That is, the mobile has to determine not only the best BS among all sectors, but also the best frequency allocation. This provides frequency diversity between the carriers due to the different long-term average interference in different frequency bands.

Optimum Frequency Allocation Scheme

Another embodiment of the invention provides a method of selecting users to be scheduled during a given slot and selecting the transmission bandwidth to be assigned for each user during the slot.

For the purpose of description, the embodiment will be described with respect to one sector within which two active users are to be scheduled. The optimum frequency allocation in other sectors can be performed using the same procedure. Also, the number of active users can be extended to more, if the entire frequency band F is divided into a larger number of frequency sub-bands.

It is assumed that pairs of users in the serving sector are indicated by $k_0$ and $k_1$ are to be individually selected to transmit the data in frequency band $F_{i0}$ and $F_{i1}$, with respective bandwidths of $W_{k_0}^{(F_{i0})}$ and $W_{k_1}^{(F_{i1})}$. It is further assumed that the transmission rate for each selected user in each slot is $R_{k_0}$ and $R_{k_1}$, when using the entire frequency bandwidth W.

Figure 5A:
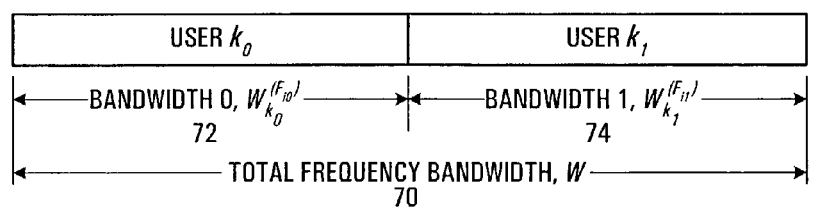
FIG. 5A illustrates an example of unequal bandwidth assigned to two users in a sector.

This is illustrated in FIG. 5A where a total frequency bandwidth, W is indicated at 70 and this is divided into two bandwidths 72, 74 which are assigned to user $k_0$ and $k_1$ respectively.

With sub-bandwidths of $W_{k_0}^{(F_{i0})}$ and $W_{k_1}^{(F_{i1})}$ the transmission rates $R_{k_0}^{(F_{i0})}$ aand $W_{k_0}^{(F_{i1})}$ are given by $$R_{k_0}^{(F_{i0})} = R_{k_0} \cdot \frac{W_{k_0}^{(F_{i0})}}{W} \quad \text{Equation 2}$$

$$R_{k_1}^{(F_{i1})} = R_{k_1} \cdot \frac{W_{k_1}^{(F_{i1})}}{W} \quad \text{Equation 3}$$

For proportional fairness user scheduling, the following optimization can be made. The optimization performs the maximization of proportional factors relative to user transmission rate and average user throughput, while keeping the total frequency bandwidth constant. This optimization can be formulated as follows:

$$\underset{W_{k_0}^{(F_{i0})}, W_{k_1}^{(F_{i1})}, k_0, k_1}{\text{Max}} \left( \frac{(R_{k_0} \cdot W_{k_0}^{(F_{i0})})^\alpha}{T_{k_0}^\beta} + \frac{(R_{k_1} \cdot W_{k_1}^{(F_{i1})})^\alpha}{T_{k_1}^\beta} \right) \quad \text{Equation 4}$$

$$W_{k_0}^{(F_{i0})} + W_{k_1}^{(F_{i1})} = W, \quad \text{Equation 5}$$

subject to: $k_0 \neq k_1$ where $T_k$ is the average user throughput over a long period of time (for example, in 1xEV-DV, it is over 1.5 seconds), and $\alpha$ and $\beta$ are the indices used to control the fairness for scheduling. Note that the ratio of $R_k^\alpha / T_k^\beta$ is used to determine an active user based on the conventional proportional fairness scheduling.

By using the Lagrangian of the above constrained optimization [4], the following unconstrained optimization formula is obtained:

$$\underset{k_0, k_1}{\text{Max}} \left( \frac{(R_{k_0} \cdot W_{k_0}^{(F_{i0})})^\alpha}{T_{k_0}^\beta} + \frac{(R_{k_1} \cdot W_{k_1}^{(F_{i1})})^\alpha}{T_{k_1}^\beta} \right) \quad \text{Equation 6}$$

where $$W_{k_0}^{(F_{i0})} = \frac{\Gamma W}{1 + \Gamma}, \quad \text{Equation 7}$$

$$W_{k_1}^{(F_{i1})} = \frac{W}{1 + \Gamma}, \quad \text{Equation 8}$$

$$\Gamma = \left[ \frac{(T_{k_0})^\beta \cdot (R_{k_1})^\alpha}{(T_{k_1})^\beta \cdot (R_{k_0})^\alpha} \right]^{\frac{1}{\alpha - 1}}, \quad k_0 \neq k_1. \quad \text{Equation 9}$$

This optimization for user scheduling is updated slot by slot. Different scheduling mechanisms can be chosen. For example, instead of proportional fairness, the adaptive scheduler used for video service could be employed [5].

Figure 5B:
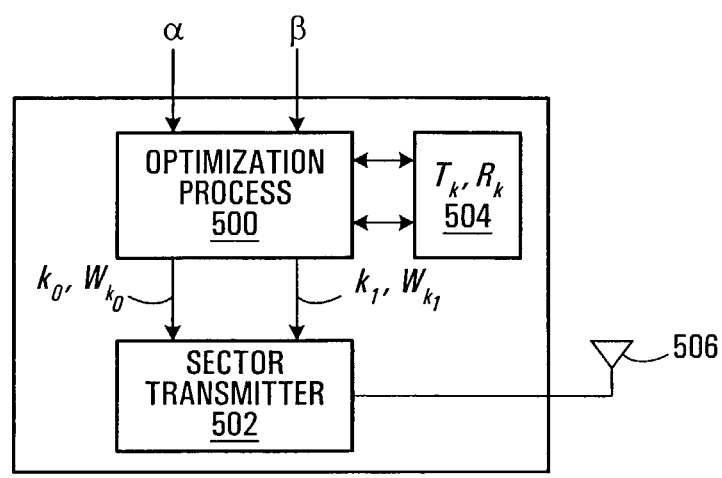
FIG. 5B is a block diagram of a system implementing the assignment of bandwidth in accordance with FIG. 5A.

FIG. 5B is a block diagram of a transmitter adapted to implement the above discussed optimization process. Shown is a sector transmitter 502 and optimization process 500. An input to the optimization process 500 is any parameters required for the process, such as $\alpha$ and $\beta$ in the above discussed example. These could be hard coded into the system. Another input to the process are the above discussed user specific values $T_k$ and $R_k$ which are maintained, for example in memory 504. The output of the optimization process 500 consists of values $k_0$, $W_{k_0}$ and $k_1$, $W_{k_1}$. These values are used by the sector transmitter 504 to obtain the appropriate amount of transmit data from each user and to generate the appropriate transmit signal for transmission over transmit antenna 506.

Implementation of Optimum Frequency Allocation for OFDM System

Another embodiment of the invention provides a method of optimum frequency allocation for OFDM systems which is very similar to the above described optimization method. This OFDM embodiment can be employed for both conventional frequency reuse-1 frequency assignment to split frequency allocation between two or more users in a sector. Alternatively, if frequency reuse-3 is employed, the OFDM embodiment still splits the assigned sector bandwidth between the two or more users.

Figure 6A:
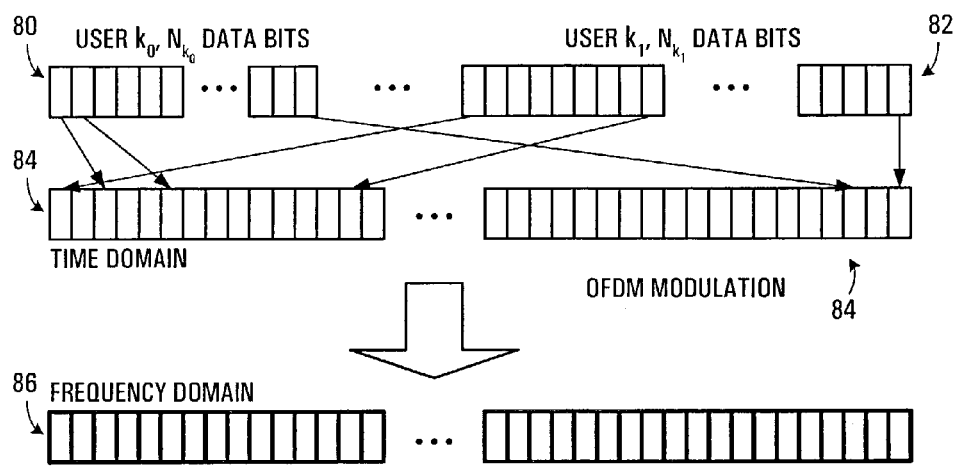
FIG. 6A is an example of optimum frequency allocation for OFDM systems, in accordance with an embodiment of the invention.

This is shown by way of example in FIG. 6 where the data bits (more generally symbols) for user $k_0$ are generally indicated by 80 and the data bits for user $k_1$ are generally indicated by 82. Depending upon the fraction of bandwidth assigned to each user, the number of bits (symbols) each user will be allowed to transmit will be different. The users bits (symbols) are mapped in the time domain to sequence 84. After OFDM modulation, these bits (symbols) are mapped to OFDM symbol 86. It can be seen that for the OFDM embodiment, the frequency bandwidth assigned for a given sector will not necessarily be divided into contiguous blocks to be used by each user. Rather, each sector will have a respective band which may or may not overlap partially or completely with the band used by adjacent sectors and the users selected to transmit on the band of that sector will have their data spread throughout the band.

For this embodiment, each receiver needs to know where to look for its data and this can be achieved with a forward signalling channel. For example, in one embodiment, as long as the receiver knows the ratio of data information for two users, it can extract its own bits from the OFMD symbols. For example, if we have N bits with the ratio of 1/3 for two users, the bit locations for the two users might be bits 'X' for the first user and bits 'Y' for the second user defined as follows: XYYYXYYYXYYY . . . . Of course, if this were to be variably defined, a forward-signaling channel would be required to indicate this ratio.

On the up-link, each mobile reports the received SNR to its serving base-station (BS) slot by slot with a certain delay (for example, two slot delay). For each permutation of two users, the BS determines the transmission rate and modulation (called adaptive modulation and coding (AMC)) based on the reported CIR. The resulting transmission rate is used in equation 9 to determine $\Gamma$, and in equations 7 and 8 to determine the optimum frequency bandwidths. After this has been done for all pairs of users, the two active users, are selected by choosing the largest value obtained from equation 6.

If there are N users for scheduling, N(N−1) times calculations must be conducted, from which the largest ones are selected to be active users.

In the BS transmitter, the data signal generated from the two active users is modulated by OFDM sub-carriers, resulting in an OFDM symbol as shown in FIG. 6. Note that the following relationship has to be maintained $$\frac{N_{k_0}}{N_{k_1}} = \frac{W_{k_0}}{W_{k_1}} \qquad \text{Equation 10}$$

where $N_{k_0}$ and $N_{k_1}$ are the number of bits for user $k_0$ and $k_1$ transmitted. It is noted that for the OFDM embodiment, the entire frequency band is shared by the users, so it is more proper to not refer to frequency bands $F_{i0}$ and $F_{i1}$ for this embodiment. All of the above equations are the same, except these frequency band references can be removed.

Figure 6B:
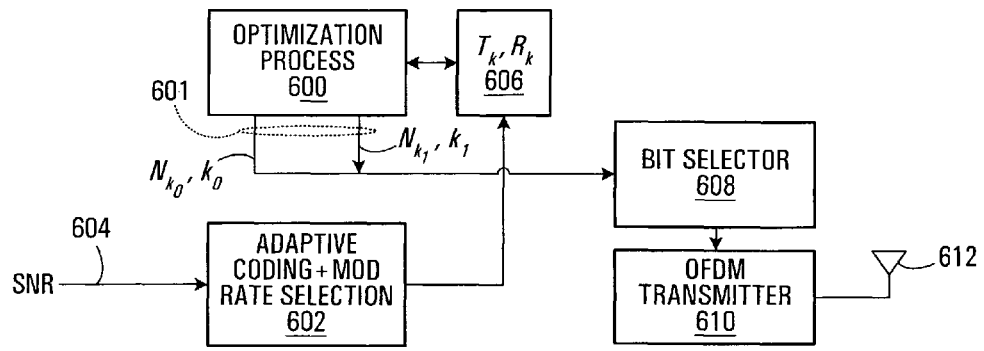
FIG. 6B is a block diagram of a wireless transmitter implementing the optimum frequency allocation for OFDM systems in accordance with FIG. 6A.
Figure 6C:
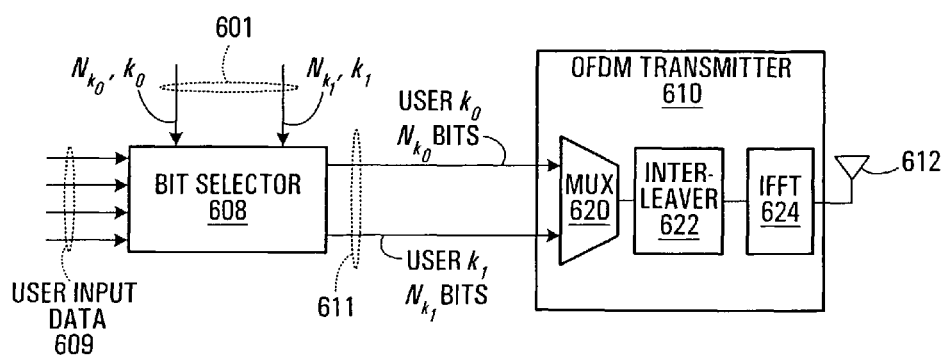
FIG. 6C is a block diagram showing further details of the OFDM transmitter of FIG. 6B and the bit selector of 6B.

FIG. 6B is a block diagram of an OFDM base system employing optimization as provided by an embodiment of the invention. Shown here again is optimization process 600 which performs optimization as a function of input values $T_k$, $R_k$ indicated generally at 606. However, in this case the values $R_k$ are determined by obtaining SNR readings 604 (or other suitable quality measures) for each mobile station, and then for each mobile station determining a rate to be employed based on adaptive coding and modulation, as indicated generally at 602. With the rates thus determined, the optimization process 600 proceeds to generate values $N_{k_0}$, $k_0$, and $N_{k_1}$, $k_1$. These values are fed to a bit selector (more generally symbol selector) function 608 which is responsible for obtaining the required number of bits from the selected users. It is to be understood that there would be many methods of implementing this, but it simply amounts to obtaining $N_{k_0}$ bits from user $k_0$ and obtaining $N_{k_1}$ bits for user $k_1$. These bits are fed to an OFDM transmitter 610 which generates an OFDM signal and transmits this on antenna 612. Further details of the bit selection and OFDM transmission are provided in FIG. 6C. Here, the bit selector 608 is shown to have the above discussed input 601 output by the optimization process 600, and also has the user input data streams 609. The appropriately selected bits, generally indicated at 611 are fed to the OFDM transmitter 610. These bits are combined and interleaved by multiplexer 620 and interleaver 622 and fed to an IFFT function 624 which generates the signal for transmission over antenna 612.

In the mobile receiver side, demodulation is performed with the entire OFDM symbol. Each active user discards the other user's data bits and picks up its own data bits by applying the inverse mapping indicated in FIG. 6A.

Optimum PN Code Allocation for CDMA

Figure 7A:
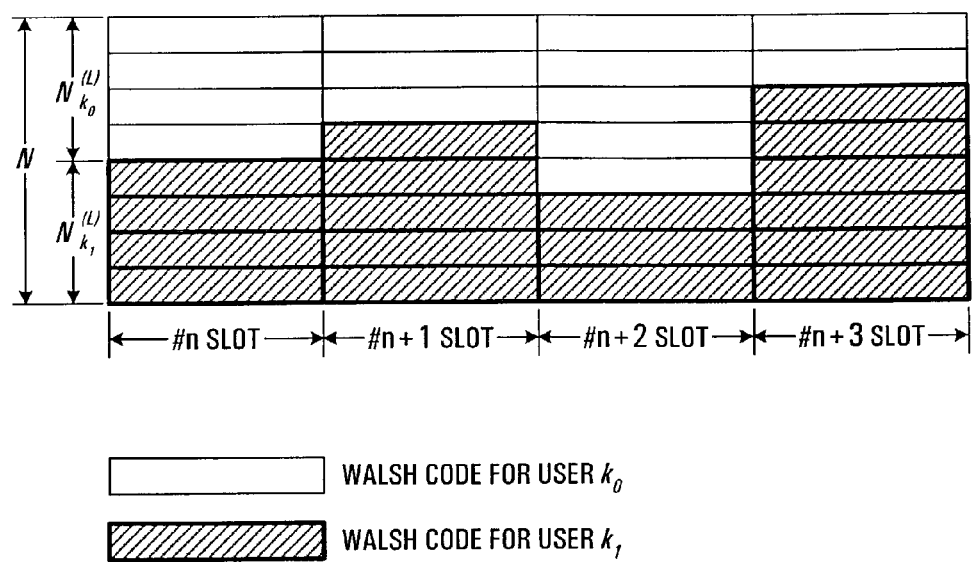
FIG. 7A is an example of Walsh code allocation for a CDMA system in accordance with an embodiment of the invention.

Another embodiment of the invention provides a method of PN code allocation for CDMA systems. An example of PN Walsh code allocation in a given sector with two active users is illustrated in FIG. 7.

It is assumed that two users indicated by $k_0$ and $k_1$ are selected to transmit the data with the number of Walsh codes $N_{k_0}^{(L)}$ and $N_{k_1}^{(L)}$, respectively. We further assume that the transmission rate for each selected user is $R_{k_0}$ and $R_{k_1}$ when using all codes N, whereby the transmission rates $R_{k_0}^{(L)}$ and $R_{k_1}^{(L)}$ with Walsh codes $N_{k_0}^{(L)}$ and $N_{k_1}^{(L)}$ can be obtained $$R_{k_0}^{(L)} = R_{k_0} \cdot \frac{N_{k_0}^{(L)}}{N} \qquad \text{Equation 11}$$

$$R_{k_1}^{(L)} = R_{k_1} \cdot \frac{N_{k_1}^{(L)}}{N}. \qquad \text{Equation 12}$$

If we consider the proportional fairness model for user scheduling, the following optimization can be made. The optimization performs the maximization of the proportional factor relative to user transmission rate and average user throughput, while keeping the total number of Walsh codes constant. This optimization can be formulated as follows:

$$\underset{N_{k_0}^{(L)}, N_{k_1}^{(L)}, k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right) \qquad \text{Equation 13}$$

subject to: $N_{k_0}^{(L)} + N_{k_1}^{(L)} = N$, $\qquad$ Equation 14

$k_0 \neq k_1$ where $T_k$ is the average user throughput, and $\alpha$ and $\beta$ are the indices used to control the fairness for scheduling. Note that the ratio of $R_k^\alpha / T_k^\beta$ is used to determine an active user based on the conventional proportional fairness scheduling.

By using the Lagrangian of the above constrained optimization [4], the following unconstrained optimization formula is obtained:

$$\underset{k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right) \qquad \text{Equation 15}$$

where $$N_{k_0}^{(L)} = \frac{\Phi N}{1 + \Phi}, \qquad \text{Equation 16}$$

$$N_{k_1}^{(L)} = \frac{N}{1 + \Phi}, \qquad \text{Equation 17}$$

$$\Phi = \left[ \frac{(T_{k_0})^\beta \cdot (R_{k_1})^\alpha}{(T_{k_1})^\beta \cdot (R_{k_0})^\alpha} \right]^{\frac{1}{\alpha - 1}}, k_0 \neq k_1. \qquad \text{Equation 18}$$

This optimization for user scheduler is updated slot by slot. The same process is followed as was described previously for the OFDM embodiment.

Figure 7B:
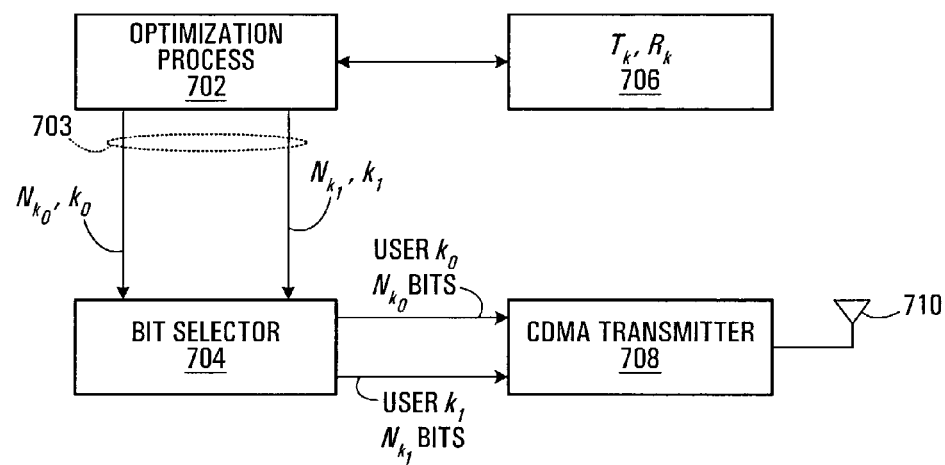
FIG. 7B is block diagram of a system implementing the Walsh code allocation scheme for a CDMA system in accordance with FIG. 7A.

FIG. 7B is a block diagram of a system in which the Walsh code selection is employed. Here, again the optimization process is indicated generally at 702 and this generates an output 703 consisting of an identification of two users and a corresponding number of Walsh codes for each user. These values are input to the bit selector 704 which selects the bits from the user input streams and passes these to a CDMA transmitter 708 which generates the CDMA signal using the appropriate number of Walsh codes for each user. The output is then transmitted on transmit antenna 710. As before, the input to the optimization process in this case consists of values $T_k$, and $R_k$, generally indicated at 706.

Other Applications Based on Lagrangian Optimization

The schedulers discussed in the previous sections are based on proportional fairness. Other forms of schedulers can be chosen. For example, we may employ the adaptive scheduler used for video service [5]. Some applications using the Lagrangian optimization could be FTP traffic service with proportional fairness scheduler, or real time video service using an adaptive scheduler [5] considering the transmission rate and packet delay. With different schedulers, however, equations like Equation 6 and Equation 9, and Equation 15 and Equation 18 would need to be modified accordingly.

Some very specific examples have been given above of block diagrams of transmitters adapted to implement various methods. It is to be understood that each of these block diagrams are simplified in the sense that a real implementation would typically include many functions not shown. These functions are not shown since they are not essential to the invention. It is further to be understood that while the block diagrams show a specific interconnectivity of functional blocks, these functional blocks could be implemented using any combination of hardware, software, firmware, etc. and the physical interconnections between the two might be different than specifically shown. Additional functions may also change the interconnections.

Performance Studies

Simulation Assumption

The simulation assumptions are mainly based on 1xEV-DV as discussed in [3]. Besides, the additional assumptions for our simulation are listed in Table 1.

TABLE 1

| Simulation assumptions. | |
|---|---|
| Number of users | 20 |
| Control factor α | 0.8 |
| Control factor β | 1.0 |
| Traffic Service | Full Buffer FTP |

Simulation Results for Frequency Reuse

The simulation results presented provide the average CIR (Geometry) results to back up the first approach of frequency reuse for OFDM systems.

To investigate the performance using frequency reuse-1 and reuse-3, the system level simulation results are expressed in terms of the system "geometry". The geometry is a measurement which corresponds to the long-term average CIR received by each mobile.

Figure 8:
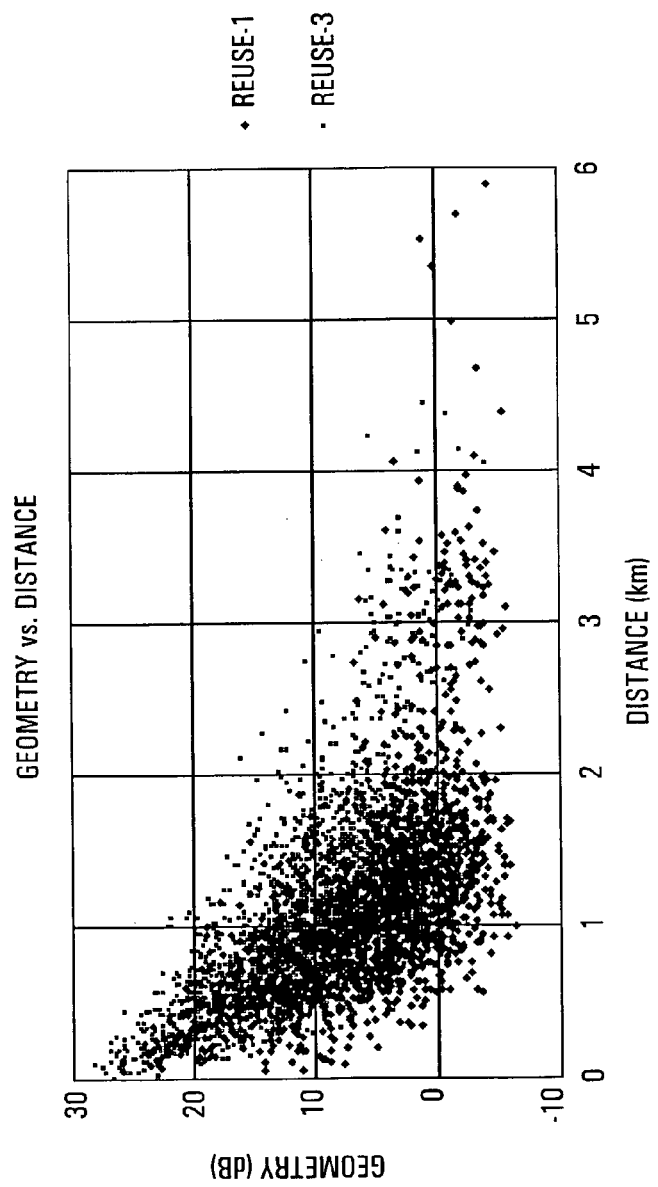
FIGS. 8 through 11 provide simulation results.
Figure 9:
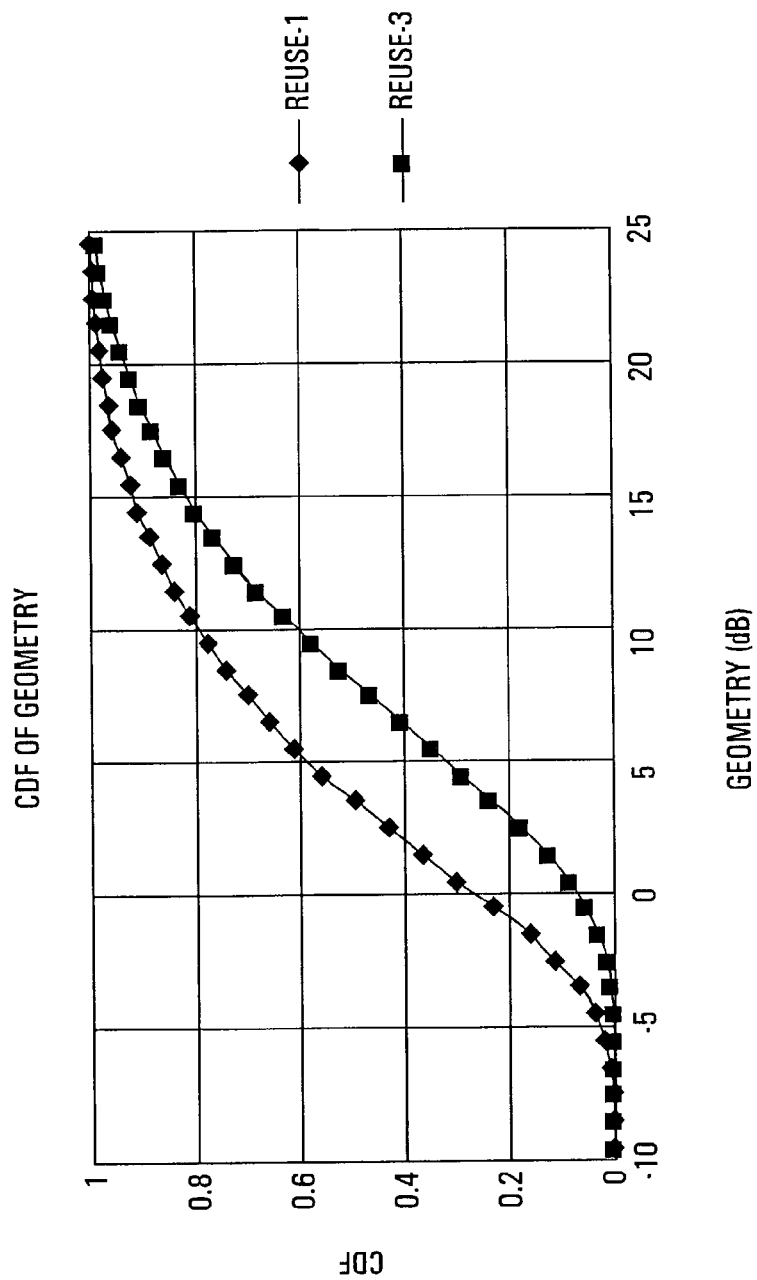

FIG. 8 shows the geometry as a function of distance between the mobile and base-station for frequency reuse-1 and reuse-3, and FIG. 9 shows the cumulative density function (CDF) of the geometry for frequency reuse-1 and reuse-3. It can be seen from FIG. 8 that the geometry achieved by frequency reuse-3 is much higher then that achieved by frequency reuse-1 due to a lower interference from other cells. From FIG. 9, in addition, it can be seen that the geometry gain achieved by frequency reuse-3 over frequency reuse-1 is about.

Simulation Results for Optimum Walsh Code Allocation

Simulation results were obtained for the optimum Walsh code allocation based on the Lagrangian optimization approach in terms of user throughput and residual frame error rate (FER).

Figure 10:
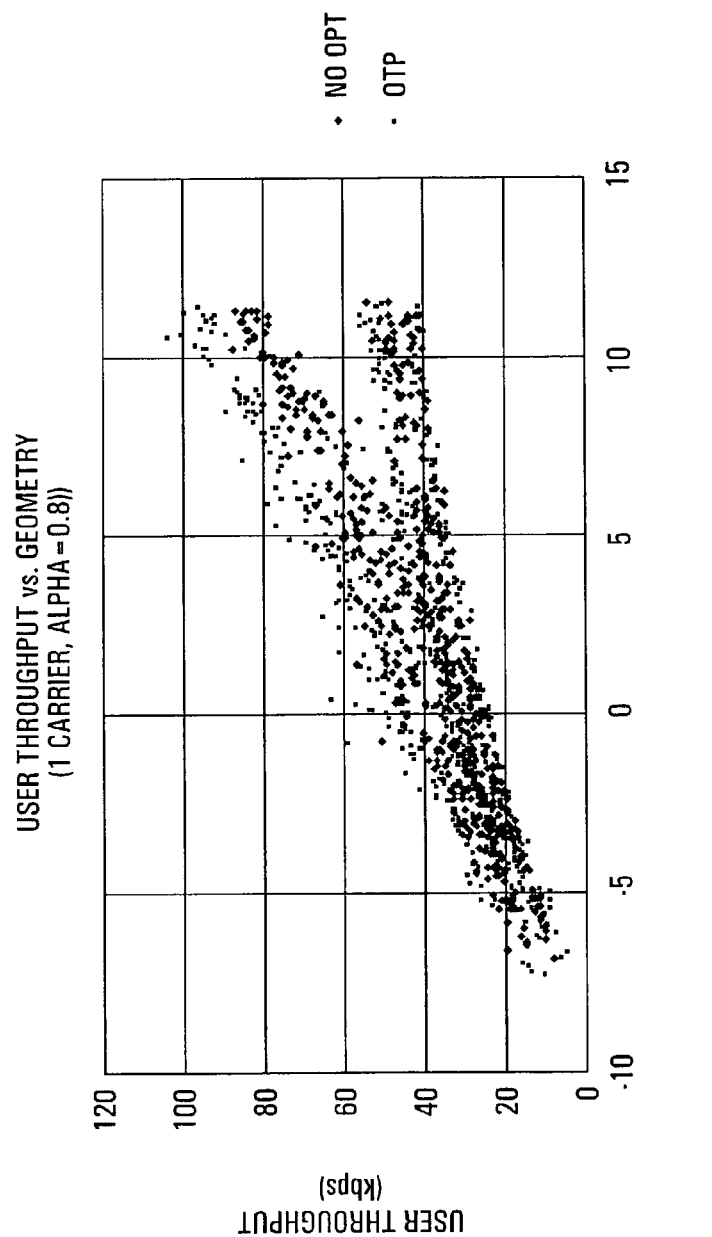

FIG. 10 shows the user throughput as a function of geometry with and without Lagrangian optimization. Several observations can be made. For both results with or without the optimum allocation, when the geometry increases, the user throughput increases as well. In addition, there are some diverging tendencies for the same geometry of users. This is because users with different channel models have different user throughput, some is higher and some is lower even with the same geometry. Lagrangian optimization algorithm achieves about 7% cell throughput gain as opposed to the regular proportional fairness scheduler.

Figure 11:
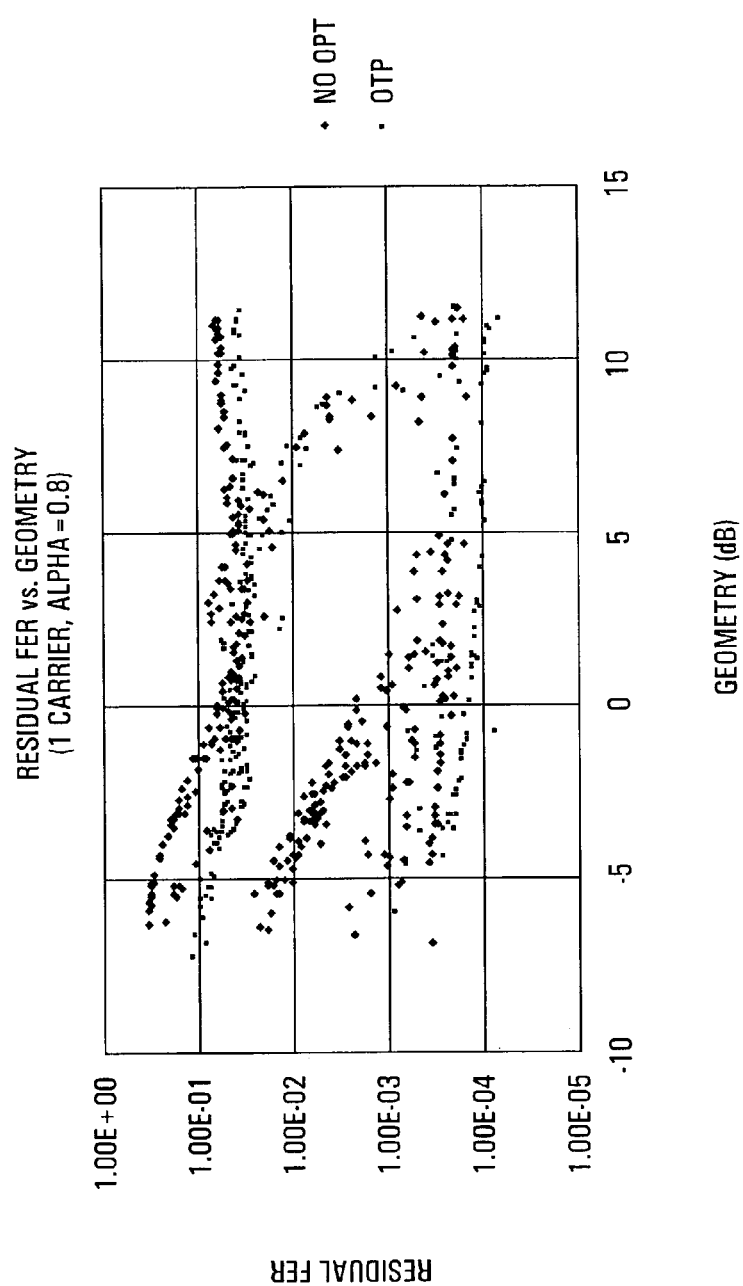

FIG. 11 shows the residual FER as a function of geometry with and without Lagrangian optimization. Several observations can be made. The results, with or without the optimum allocation, indicate that the residual FER behave differently. One method shows a higher FER valuethan the other. This is because different channel models use different velocity for the mobile, resulting in difference results even with the same geometry. If the velocity is higher, the MCS decision will be inaccurate resulting in a higher FER even with three retransmissions (maximum transmission). The Lagrangian optimization approach can reduce the average residual FER by half as compared to the regular proportional fairness scheduler.

Performance Summary for Optimum Walsh Code Allocation

The simulation results relative to average sector throughput and average residual FER are listed in Table 2.

TABLE 2

| Cell throughput and residual FER with and without Lagrangian Optimization. | | | |
|---|---|---|---|
| | Proportional Fairness | Lagrangian Optimization | Gain |
| Av. Sector Throughput | 777.46 (kbps) | 830.23 (kbps) | 6.9% |
| Av. Residual FER | 2.58−e02 | 1.13−e02 | 2.3x |

REFERENCES

[1] Richard Van Nee and Ramjee Prasad, OFDM for Wireless Multimedia Communication, Artech House Boston-London, 2000.

[2] 3rd Generation Partnership Project; Technical Specification Group Radio Access Network; Physical layer aspects of UTRA High Speed Downlink Packet Access (Release 4), 3GPP TR 25.848, V4.0.0, March 2001.

[3] 1xEV-DV Evaluation Methodology—Addendum (V6), Jul. 25, 2001.

[4] David G. Luenberger, Linear and Nonlinear Programming, Addison-Wesley Publishing Company, Inc., Second Edition, 1984.

[5] J. Wu and W. Tong, A data streaming service using adaptive transmission scheduling, Nortel Networks Patent, 14809RO, August 2001.

Numerous modifications and variations of the present invention are possible in light of the above teachings. It is therefore to be understood that within the scope of the appended claims, the invention may be practised otherwise than as specifically described herein.

The invention claimed is:

1. A method of allocating a total frequency bandwidth among a plurality of sectors in a cell, for application in three sector cells, the method comprising:
    allocating a respective subset of the total frequency to each sector, each subset comprising at least two sub-bands;
    wherein the respective subsets allocated to any two adjacent sectors have at least one sub-band in common and at least one sub-band which is not in common; and
    wherein each sub-band comprises one-third of the total frequency bandwidth such that the respective subset allocated to each sector comprises two-thirds of the total frequency bandwidth and each sector shares one third of the total frequency bandwidth with each adjacent sector.

2. A method according to claim 1 wherein allocating the respective subset of the total frequency bandwidth to each sector comprises:
    sub-dividing the total frequency bandwidth into a plurality of fixed sub-bands; and
    assigning two of the fixed sub-bands to the respective subset of each sector.

3. A method according to claim 2 wherein the fixed sub-bands are equal in size.

4. A method according to claim 2 further comprising:
    in each sector, transmitting a respective user transmission on each of the sub-bands.

5. A method according to claim 1 wherein, in a network comprising a pair of adjacent cells, a first sector of one of the cells has at least one sub-band in common with an immediately adjacent sector of the other cell, and at least one sub-band which is not in common with the immediately adjacent sector of the other cell.

6. A method according to claim 1 further comprising:
for each sector, scheduling users for transmission on the respective subset of the total frequency bandwidth allocated to any given sector, by:
performing an optimization for a selected scheduler design, the optimization selecting at least two users from among a plurality of users, and determining for each user a respective fraction of capacity associated with the respective subset of the total frequency bandwidth allocated to the sector; and
generating and transmitting a signal in which each of the at least two users has the respective fraction of capacity.

7. A method according to claim 6 wherein the optimization is performed every transmission interval, and the optimization maximizes sector throughput.

8. A method according to claim 1 further comprising:
in each sector, transmitting an OFDM signal using the respective subset of the total OFDM bandwidth.

9. A method according to claim 8 wherein in each sector, transmitting an OFDM signal using the respective subset of the total OFDM bandwidth comprises:
generating the OFDM signal from content of at least two users.

10. A method according to claim 9 wherein in each sector generating the OFDM signal from content of at least two users comprises:
mapping symbols from each user into a time domain representation;
converting the time domain representation into the OFDM signal.

11. A method according to claim 10 wherein mapping symbols from each user into a time domain representation comprises interleaving.

12. A method according to claim 10 further comprising:
for each sector, performing an optimization to identify the at least two users, and to determine for each user a respective number of symbols to be mapped into said time domain representation.

13. A method of allocating a total frequency bandwidth among a plurality of sectors of a cell, the method comprising:
allocating a respective subset of the total frequency to each sector, each subset comprising at least two sub-bands;
wherein the respective subsets allocated to any two adjacent sectors have at least one sub-band in common and at least one sub-band which is not in common; and
for each sector, scheduling users for transmission on the respective subset of the total frequency bandwidth allocated to any given sector, by:
performing an optimization for a selected scheduler design, the optimization selecting at least two users from among a plurality of users, and determining for each user a respective fraction of capacity associated with the respective subset of the total frequency bandwidth allocated to the sector; and
generating and transmitting a signal in which each of the at least two users has the respective fraction of capacity,
wherein the scheduler design is selected from a group comprising:
proportional fairness, proportional fairness for FTP traffic, adaptive scheduler, adaptive scheduler for video service.

14. A method according to claim 13 wherein the optimization performs a maximization of proportional factors relative to user transmission rate and average user throughput, while keeping a total frequency bandwidth constant.

15. A method according to claim 13 further comprising in performing the optimization, using an unconstrained optimization obtained by using a Lagrangian of a constrained optimization.

16. A method according to claim 13 wherein the optimization comprises:
for each pair of users indicated by $k_0$ and $k_1$ associating respective frequency bandwidth $F_{i0}$ and $F_{i1}$, where I indicated the sector number and 0,1 indicated the active user number, and respective bandwidths of $$W_{k_0}^{(F_i0)}$$

and $W_{k_1}^{(F_i0)}$;
determining a transmission rate for each selected user in each slot to be $R_{k_0}$ and $R_{k_1}$, when using the available frequency bandwidth W, and with sub-bandwidths of $W_{k_0}^{(F_i0)}$ and $W_{k_1}^{(F_i1)}$, determining transmission rates $R_{k_0}^{(F_i0)}$ and $R_{k_0}^{(F_i1)}$ according to $$R_{k_0}^{(F_i0)} = R_{k_0} \cdot \frac{W_{k_0}^{(F_i0)}}{W}$$

$$R_{k_1}^{(F_i1)} = R_{k_1} \cdot \frac{W_{k_1}^{(F_i1)}}{W}$$

performing optimization which maximizes sector throughput, applied to two users per sector or generalized to N users per sector, where N>=3.

17. A method according to claim 16 wherein the optimization is formulated as follows:

$$\underset{W_{k_0}^{(F_i0)}, W_{k_1}^{(F_i1)}, k_0, k_1}{\text{Max}} \left( \frac{(R_{k_0} \cdot W_{k_0}^{(F_i0)})^\alpha}{T_{k_0}^\beta} + \frac{(R_{k_1} \cdot W_{k_1}^{(F_i1)})^\alpha}{T_{k_1}^\beta} \right)$$

subject to: $W_{k_0}^{(F_i0)} + W_{k_1}^{(F_i1)} = W, k_0 \neq k_1$ where $T_k$ is an average user throughput for user k over a long period of time and $\alpha$ and $\beta$ are indices used to control the fairness for scheduling, applied for two users, or generalized to schedule N users in the transmission interval, where N>=3.

18. A method according to claim 17 further comprising using a Lagrangian of the optimization to obtain the following unconstrained optimization formula:

$$\underset{k_0, k_1}{\text{Max}} \left( \frac{(R_{k_0} \cdot W_{k_0}^{(F_i0)})^\alpha}{T_{k_0}^\beta} + \frac{(R_{k_1} \cdot W_{k_1}^{(F_i1)})^\alpha}{T_{k_1}^\beta} \right)$$

where $W_{k_0}^{(F_i0)} = \frac{\Gamma W}{1 + \Gamma}$, $W_{k_1}^{(F_i1)} = \frac{\Gamma W}{1 + \Gamma}$, $\Gamma = \left[ \frac{(T_{k_0})^\beta \cdot (R_{k_1})^\alpha}{(T_{k_1})^\beta \cdot (R_{k_0})^\alpha} \right]^{\frac{1}{\alpha - 1}}$, -continued $$k_0 \neq k_1.$$

19. A method of scheduling users for transmission on an available bandwidth allocated to a transmitter, the method comprising:
performing an optimization for a selected scheduler design, the optimization selecting at least two users from among a plurality of users, and determining for each user a respective fraction of capacity associated with the available bandwidth allocated to the transmitter; wherein the optimization is performed every transmission interval, and the optimization maximizes sector throughput,
wherein the scheduler design is selected from a group comprising:
proportional fairness, proportional fairness for FTP traffic, adaptive scheduler, adaptive scheduler for video service.

20. A method according to claim 19 wherein the optimization performs a maximization of proportional factors relative to user transmission rate and average user throughput, while keeping a total frequency bandwidth constant.

21. A method according to claim 20 further comprising in performing the optimization, using an unconstrained optimization obtained by using a Lagrangian of a constrained optimization.

22. A method according to claim 19 further comprising generating an OFDM signal in which each of the at least two users has the respective fraction of capacity, wherein the OFDM signal is generated from content of the at least two users by mapping with interleaving bits from each user into a time domain representation and converting the time domain representation into the OFDM signal.

23. A method according to claim 22 wherein for each sector, the optimization determines for each of the selected users a respective number of symbols to be mapped into the time domain representation, the respective number of symbols comprising said respective fraction of capacity.

24. A method according to claim 22 wherein the optimization performs a maximization of proportional factors relative to user transmission rate and average user throughput, while keeping a total frequency bandwidth constant.

25. A method according to claim 22 wherein the optimization comprises:
for each pair of users indicated by $k_0$ and $k_1$ with respective sub-bandwidths of $W_{k_0}$ and $W_{k_1}$, determining a transmission rate for each user in each slot to be $R_{k_0}$ and $R_{k_1}$, when using the available frequency bandwidth W, and with sub-bandwidths of $W_{k_0}$ and $W_{k_1}$, the transmission rates $R_{k_0}$ and $R_{k_0}$ are given by $$R_{k_0} = R_{k_0} \cdot \frac{W_{k_0}}{W}$$

$$R_{k_1} = R_{k_1} \cdot \frac{W_{k_1}}{W}$$

performing optimization which maximizes sector throughput.

26. A method according to claim 25 generalized to schedule N users per sector, where N>=3.

27. A method according to claim 25 further comprising:
receiving a channel quality indication from each user being considered for scheduling;
for each permutation of two users, calculating transmission rates according to adaptive modulation and coding as a function of the channel quality indications and using the calculated transmission rates in the optimization.

28. A method according to claim 27 wherein the channel quality indications comprise SNR (signal-to-noise ratio) values.

29. A method according to claim 25 wherein the optimization is formulated as follows:

$$\underset{W_{k_0},W_{k_1},k_0,k_1}{\text{Max}} \left( \frac{(R_{k_0} \cdot W_{k_0})^\alpha}{T_{k_0}^\beta} + \frac{(R_{k_1} \cdot W_{k_1})^\alpha}{T_{k_1}^\beta} \right)$$

$$\text{subject to: } W_{k_0} + W_{k_1} = W,$$

$$k_0 \neq k_1$$

where $T_k$ is an average user throughput for user k over a long period of time and $\alpha$ and $\beta$ are the indices used to control the fairness for scheduling.

30. A method according to claim 29 generalized to schedule N users in the transmission interval, where N>=3.

31. A method according to claim 29 further comprising using a Lagrangian of the optimization to obtain the following unconstrained optimization formula:

$$\underset{k_0,k_1}{\text{Max}} \left( \frac{(R_{k_0} \cdot W_{k_0})^\alpha}{T_{k_0}^\beta} + \frac{(R_{k_1} \cdot W_{k_1})^\alpha}{T_{k_1}^\beta} \right)$$

$$\text{where } W_{k_0} = \frac{\Gamma W}{1+\Gamma},$$

$$W_{k_1} = \frac{W}{1+\Gamma},$$

$$\Gamma = \left[ \frac{(T_{k_0})^\beta \cdot (R_{k_1})^\alpha}{(T_{k_1})^\beta \cdot (R_{k_0})^\alpha} \right]^{\frac{1}{\alpha-1}},$$

$$k_0 \neq k_1.$$

32. A method according to claim 29 generalized to schedule N users in the transmission interval, where N>=3.

33. A method of scheduling users for transmission on an available bandwidth allocated to a transmitter, the method comprising:
performing an optimization for a selected scheduler design, the optimization selecting at least two users from among a plurality of users, and determining for each user a respective fraction of capacity associated with the available bandwidth allocated to the transmitter; wherein the optimization is performed every transmission interval, and the optimization maximizes sector throughput,
the method further comprising generating a CDMA signal from content of at least two users by modulating content of each user to a respective subset of a set of orthogonal codes.

34. A method according to claim 33 wherein for each sector, the optimization determines for each of the at least two users a respective number of orthogonal codes in the respective subset, the respective number of orthogonal codes comprising said respective fraction of capacity.

35. A method according to claim 34 wherein the optimization performs a maximization of proportional factors relative to user transmission rate and average user throughput, while keeping the total frequency bandwidth constant.

36. A method according to claim 34 wherein two users indicated by $k_0$ and $k_1$ are to be selected to transmit data with a number of Walsh codes $N_{k_0}^{(L)}$ and $N_{k_1}^{(L)}$, respectively and at transmission rate for each $R_{k_0}$ and $R_{k_1}$ respectively when using all N available codes, whereby the transmission rates $R_{k_0}^{(L)}$ and $R_{k_1}^{(L)}$ with orthogonal codes $N_{k_0}^{(L)}$ and $N_{k_1}^{(L)}$ can be obtained $$R_{k_0}^{(L)} = R_{k_0} \cdot \frac{N_{k_0}^{(L)}}{N}$$

$$R_{k_1}^{(L)} = R_{k_1} \cdot \frac{N_{k_1}^{(L)}}{N}.$$

37. A method according to claim 36 generalized to schedule M users each scheduling period.

38. A method according to claim 36 wherein proportional fairness as a user scheduler is employed, and the optimization maximizes a proportional factor relative to user transmission rate and average user throughput, while keeping the total number of orthogonal codes constant.

39. A method according to claim 38 wherein the optimization is be formulated as follows:

$$\underset{N_{k_0}^{(L)}, N_{k_1}^{(L)}, k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right)$$

$$N_{k_0}^{(L)} + N_{k_1}^{(L)} = N,$$

subject to: $k_0 \ne k_1$ where $T_k$ is an average user throughput for user k, and $\alpha$ and $\beta$ are the indices used to control the fairness for scheduling.

40. A method according to claim 39 further comprising using a Lagrangian of the optimization of claim 36 to obtain the following unconstrained optimization formula:

$$\underset{k_0, k_1}{\text{Max}} \left( \frac{(R_{k_0} \cdot N_{k_0}^{(L)})^\alpha}{T_{k_0}^\beta} + \frac{(R_{k_1} \cdot N_{k_1}^{(L)})^\alpha}{T_{k_1}^\beta} \right)$$

where $$N_{k_0}^{(L)} = \frac{\Phi N}{1+\Phi},$$

$$N_{k_1}^{(L)} = \frac{N}{1+\Phi},$$

$$\Phi = \left[ \frac{(T_{k_0})^\beta \cdot (R_{k_1})^\alpha}{(T_{k_1})^\beta \cdot (R_{k_0})^\alpha} \right]^{\frac{1}{\alpha-1}}, k_0 \ne k_1.$$

41. A method according to claim 33 wherein the orthogonal codes are Walsh codes.

42. An apparatus comprising:
a respective transmitter and antenna for each sector of a plurality of sectors in a cell, each transmitter using a respective subset of a total frequency bandwidth, wherein each subset comprises at least two sub-bands of the total frequency bandwidth, and wherein the respective subsets allocated to any two adjacent sectors have at least one sub-band in common and at least one sub-band which is not in common; and an optimization process adapted to, for each sector, schedule users for transmission on the respective subset of the total bandwidth by:
for a given transmitter, allocating a respective fraction of capacity associated with the available bandwidth to each of at least two users selected from a plurality of users by performing an optimization for a selected scheduler design, the optimization selecting the at least two users and the optimization determining for each user the respective fraction of capacity,
wherein the optimization process uses an unconstrained optimization obtained by using a Lagrangian of a constrained optimization.

43. An apparatus according to claim 42 wherein each transmitter is configured to transmit a respective user transmission on each of the sub-bands.

44. An apparatus according to claim 42 wherein each transmitter comprises a respective OFDM transmitter adapted to generate a respective OFDM signal using the respective subset of the total bandwidth.

45. An apparatus according to claim 44 wherein each OFDM signal is generated from content of at least two users.

46. An apparatus according to claim 44 further comprising:
a symbol selector for selecting symbols for each of the at least two users;
an interleaver for mapping the bits from the at least two users to a time domain representation;
an IFFT function for converting the time domain representation into the OFDM signal.

47. An apparatus according to claim 44 further comprising an optimizer for performing an optimization in each sector to identify the at least two users, and for each user a respective fraction of symbols to be mapped into said time domain representation.

48. An apparatus for scheduling users for transmission on an available bandwidth allocated to a transmitter, the apparatus comprising:
an optimizer adapted to perform an optimization for a selected scheduler design, the optimization selecting at least two users from a plurality of users, and determining for each user a respective fraction of capacity associated with the available bandwidth allocated to the transmitter, wherein the optimization maximizes sector throughput; and
signal generation circuitry for generating a signal in which each of the at least two users have the respective fraction of capacity,
wherein said signal is an OFDM signal, said signal generation circuitry comprises a symbol selector for selecting symbols for each user and mapping them to a time domain representation, and an IFFT function for mapping the time domain representation into a frequency domain representation.

49. An apparatus according to claim 48 forming part of a multi-sector transmitting apparatus in which a respective subset of a total frequency bandwidth is allocated to each sector of the multi-sector transmitting apparatus, wherein the respective subsets allocated to any two adjacent subset only partially overlap.

50. An apparatus for scheduling users for transmission on an available bandwidth allocated to a transmitter, the apparatus comprising:
an optimizer adapted to perform an optimization for a selected scheduler design, the optimization selecting at least two users from a plurality of users, and determining for each user a respective fraction of capacity associated with the available bandwidth allocated to the transmitter, wherein the optimization maximizes sector throughput; and signal generation circuitry for generating a signal in which each of the at least two users have the respective fraction of capacity, wherein said signal is a CDMA signal, the apparatus comprising:

a plurality of Walsh code spreaders adapted to perform Walsh code spreading with a respective Walsh code of a set of Walsh codes, wherein the CDMA signal is generated from content of the at least two users by modulating content of each user with a respective subset of the set of Walsh codes.

51. An apparatus according to claim 50 the optimizer determines for each of the at least two users a respective number of orthogonal codes in the respective subset, the respective number of orthogonal codes comprising said respective fraction of capacity.

* * * * *